Jan. 26, 1965   C. E. LEE ETAL   3,167,731
MAGNETIC PICK-UP DEVICE

Filed Jan. 3, 1962   3 Sheets-Sheet 1

Charles E. Lee
Richard L. Moore,
*INVENTORS.*

BY S. J. Rotondi
A. J. Dupont
Julian W. Douty

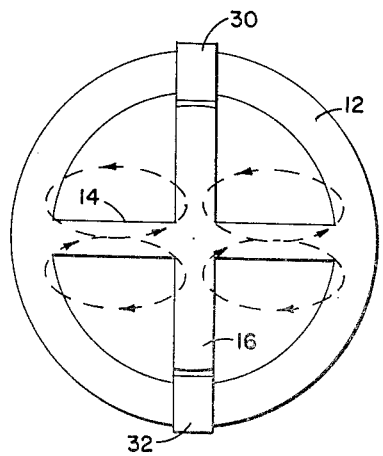
NULL POSITION FIG. 3A
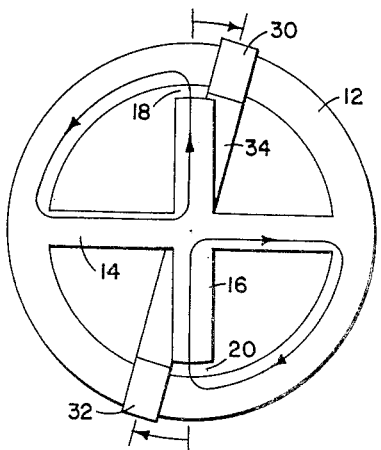
CLOCKWISE DISPLACEMENT FIG. 3B
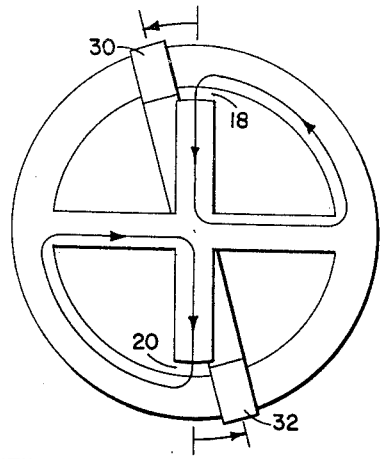
COUNTER-CLOCKWISE DISPLACEMENT FIG. 3C
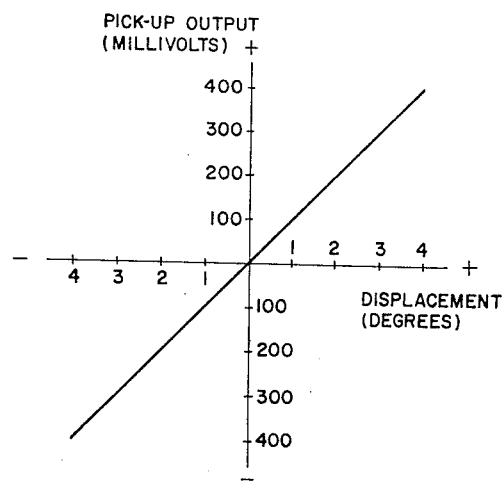
FIG. 6
Charles E. Lee
Richard L. Moore
INVENTORS.
BY S. J. Rotondi
a. J. Dupont
Julian W. Dority Jan. 26, 1965 C. E. LEE ETAL 3,167,731
MAGNETIC PICK-UP DEVICE
Filed Jan. 3, 1962 3 Sheets-Sheet 3

Charles E. Lee
Richard L. Moore,
INVENTORS.

BY S. J. Rotondi
A. J. Dupont
Julian W. Dority

United States Patent Office 3,167,731
Patented Jan. 26, 1965

3,167,731
MAGNETIC PICK-UP DEVICE
Charles E. Lee and Richard L. Moore, Huntsville, Ala., assignors, by direct and mesne assignments, to the United States of America as represented by the Secretary of the Army
Filed Jan. 3, 1962, Ser. No. 164,203
7 Claims. (Cl. 336—79)

The invention described herein may be manufactured and used by or for the Government for governmental purposes without the payment of any royalty thereon.

This invention relates to a pick-up device and more particularly to a device for determining angular movement.

In the missile field there is a need for a device to measure small angular movements which is not affected by horizontal and vertical movements to the center axis. There is a further need for a device for measuring angular movement while producing a very small reaction torque to the element whose movement is being measured.

In view of these facts, an object of this invention is to provide a device for measuring angular movement.

Another object of this invention is to provide a pick-up device which is not affected by horizontal and vertical movements to the center axis.

It is still another object of this invention to provide a pick-up device which has a very small reaction torque to the element whose movement is being measured.

It is still a further object of this invention to provide a substantially linear output responsive to the angular movement of the element being measured.

The foregoing and other objects of this invention will become more fully apparent from the following detailed description of the invention and from the accompanying drawings, in which.

FIGURES 3a, 3b, and 3c show the flux patterns within the pick-up device at different positions of the shorting coils.

Figure 4:
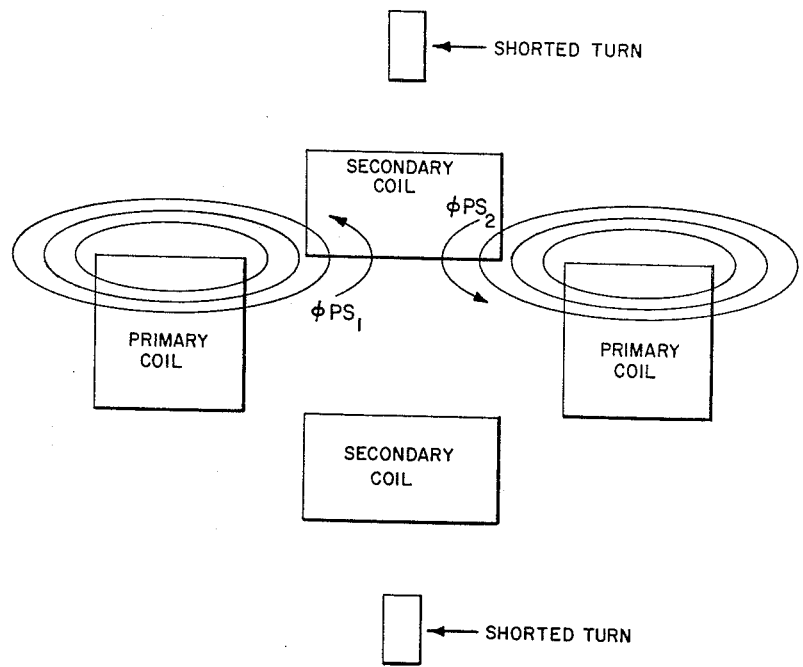

FIGURE 4 shows the primary coils stray flux distribution.

Figure 5:
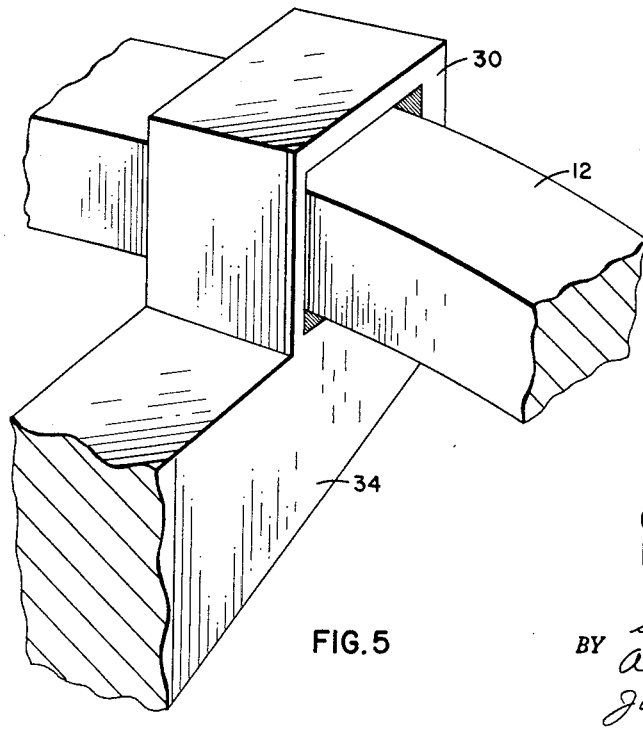

FIGURE 5 is an exploded view showing the shorting coils encircling the core.

FIGURE 6 shows a particular pick-up device's output characteristic curve.

Figure 1:
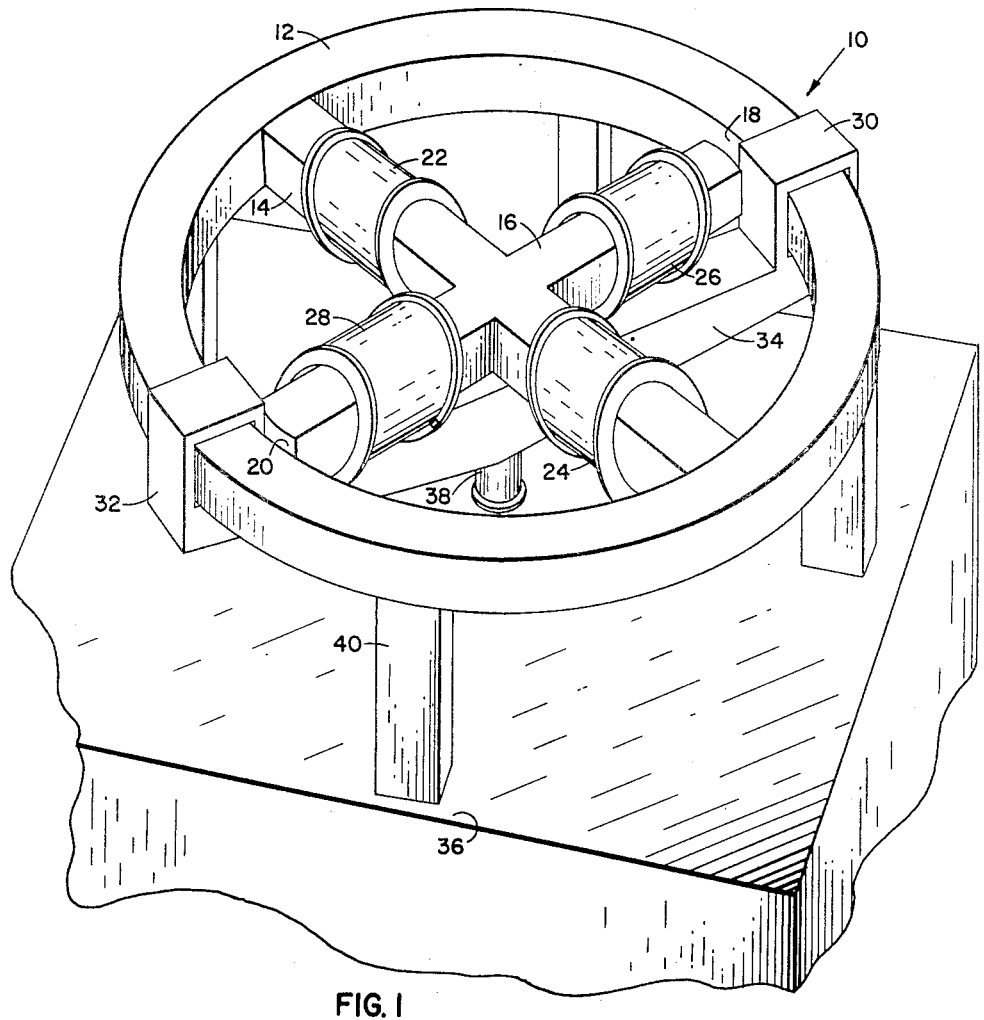
FIGURE 1 is a pictorial view of the pick-up device.

Referring more particularily to the drawings wherein like reference characters refer to like or corresponding parts throughout the different views, the numeral 10 (FIGURE 1) designates a pick-up device. Device 10 is provided with a toroidal magnetic core 12; a horizontal magnetic bar 14 connected to the toroidal core; a vertical magnetic bar 16 centrally connected and perpendicular to horizontal bar 14 and positioned to form a pair of air gaps 18 and 20 between its ends and the inside of the toroidal core. A first and a second primary winding 22 and 24 respectively, are coupled to opposite ends of the horizontal bar to provide flux flow in the pick-up device when they are energized, and a first and a second secondary windings, 26 and 28 respectively, are coupled to opposite ends of the vertical magnetic bar for determining the amount of flux that flows through the vertical bar. A pair of shorting coils 30 and 32, which are made of copper, encircle the toroidal core for controlling the coupling between the primary windings and the secondary windings. The shorting coils inner surfaces are large enough so that they can move relative to the core without coming in physical contact with the core. However, if the pick-up is used to measure the angular movement of a device, such as a stepping motor, where friction and reaction torque are not critical to its operation, the coils can slide along the core. In order to move the coils in unison along the core, they are connected together by means of a non-magnetic bar 34. Bar 34 is attached to a device, whose angular movement is being transmitted by a shaft 38. Such a device, which is enclosed in housing 36, could be an air bearing gyro or an accelerometer. The toroidal core is held stationary by the support members 40 which are supported by housing 36.

Figure 2:
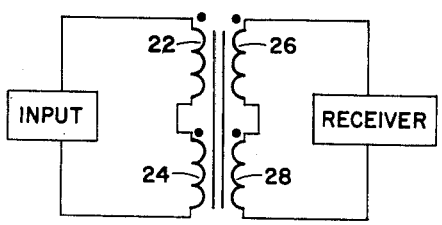
FIGURE 2 is a schematic diagram showing the interconnection of the primary and secondary coils.

The primary windings are connected in series and are connected to any suitable energizing source as shown schematically in FIGURE 2. Furthermore, the secondary windings are connected in series so that the output potential developed by the secondary windings add if the flux flow in upper and lower portion of leg 16 is in the same direction (FIGURE 3b).

Due to the particular design of the measuring device a very small reaction torque is developed, therefore, the measuring device is very sensitive and can be used to measure the angular movement of devices such as air bearing gyros and accelerometers.

The desirable feature of the shorted turn pick-up in exhibiting a very small reaction torque may be attributed to the following:

(1) The relative long distance between the shorted coil and the primary coils results in the primary leakage flux which links the shorted turn to be very small.

(2) The stray flux from the two excitation coils ($\phi_{ps1}$, and $\phi_{ps2}$) experience a cancellation effect due to the physical location of the coils (as shown in FIGURE 4).

(3) Due to the orientation of the excitation coils, the stray flux that links the shorted turn develops a greater component of reaction torque in a radial rather than a tangential direction.

(4) An additional return path of the flux when the shorted turn is displaced is provided through the air gap and the secondary coils. The symmetry of design will allow the reluctance paths to remain balanced, therefore, the inductance of the two primary coils will remain approximately equal. This results in the stray flux of the two primary coils being approximately equal and opposite. Since these stray flux are equal and opposite, they would cancel and the net flux would be substantially zero.

(5) The stray flux of the secondary coil is very small due to the small air gap which restricts the flux to the magnetic material.

The operation of the device is as follows:

When the central portion of non-magnetic bar 34 is attached to the device whose angular movement is to be measured (FIGURE 1) and the shorting coils are in the null position as shown in FIGURE 3a, the flux flow, that is produced by the primary winding when energized, will follow the path of least reluctance. Since the shorting coils are made of copper, they offer a very high reluctance to the flux flow and the paths that the flux takes when the shorting coils are in the null position are as shown in FIGURE 3a. If, however, the bar on which the shorted coils are disposed is displaced in a clockwise direction, by movement of the device whose angular movement is to be measured, as shown in FIGURE 3b, a low reluctance path is provided for the flux through the secondary coils and the air gaps in the direction as shown by the arrows. It is noted that each flux flow through the two secondary windings is in the same direction, therefore, the potentials developed by the secondary windings will add. A counter-clockwise displacement of the shorted coils (FIGURE 3c) will also result in a flux flow through the secondary coils and the air gaps to generate a potential 180° out of phase from that generated by a clockwise displacement of the shorting coils. The output voltage is proportional to the flux linking the secondary coil and the angular displacement of the shorted coils. Since the shorting coils control the flux linkage between the primary and secondary coils, the output voltage is linear and also proportional to the angular movement of the shorting coils while they are in air gaps 18 and 20.

It is apparent from the flux flow diagrams that a vertical movement of the shorted coils will provide flux paths through the secondary coils and the air gaps but their direction will be in opposition. Therefore, the flux linking the secondary coils will be equal and opposite and a null condition will result. Horizontal movement of the shorted coils will not unbalance the reluctance paths, therefore, no change in output will be detected.

In one particular example where the diameter of the measuring device is approximately three centimeters, at null position and with displacement of not more than ±¼ degree of the shorting coils, the reaction torque of the shorting coil bar to the device whose movement is being measured is less than one dyne cm. This is based on a 5 volt, 400 cycle excitation and the output loaded with 2.2K ohms.

The above mentioned measuring device's output characteristic is shown in FIGURE 6. From this curve it may be seen that the output voltage is substantially linear and symmetrical at ±4 degrees displacement of the shorting coils. This linearity and symmetry has been achieved in design, construction, and assembly, by using curved laminations, proper pole face width, matched layer wound coils and interleaving the laminations in order to obtain balanced flux paths. High sensitivity, low null, linear in phase component, and 180° phase shift at null are features that have been achieved, by using two coils in series in the output and obtaining near perfect symmetry in design.

It is to be understood that the form of the invention that is herein shown and described is the prefered embodiment, and that various changes in the shape, size and arrangement of parts may be resorted to without departing from the spirit of the invention or the scope of the subjoined claims.

We claim:

1. A magnetic pick-up device comprising: a toroidal magnetic core; first and second bar members being connected to each other, said first bar member having its ends connected to said magnetic core, said second bar member being disposed to form air gaps between its ends and said core; a pair of primary windings coupled to said first bar member; a pair of secondary windings coupled to said second bar member; and means for controlling the coupling between said primary windings and said secondary windings when said primary windings are energized.

2. A device as set forth in claim 1 wherein said primary windings are connected in series and said secondary windings are connected in series.

3. A device as set forth in claim 2 wherein said means for controlling the coupling between said primary windings and secondary windings comprises: a third bar member, and a pair of shorting coils connected to opposite ends of said third bar member and encompassing said magnetic core for movement relative to said core.

4. A magnetic pick-up device comprising: a toroidal magnetic core; a magnetic member having first, second, third and fourth legs in that respective order, said first and third legs being connected to said core and disposed along a diameter thereof, said second leg disposed to form a first air gap between the inner side of said core and said second leg; said fourth leg being disposed to form a second air gap between said inner side of said core and said fourth leg; a first primary winding coupled to said first leg; a second primary winding coupled to said third leg; a first secondary winding coupled to said second leg; a second secondary winding coupled to said fourth leg; means for controlling the coupling between said primary windings and said secondary windings when said primary windings are energized.

5. The device as set forth in claim 4 wherein said first and second primary windings are connected in series and said first and second secondary windings are connected in series.

6. The device as set forth in claim 5 wherein said means for controlling the coupling between said primary and secondary windings is a pair of shorting coils.

7. The device as set forth in claim 6 wherein said shorting coils are attached to a bar member and diametrically spaced on said core member for movement relative to said core.

References Cited by the Examiner
UNITED STATES PATENTS 2,631,272 3/53 Smith _____ 336—134 X
2,700,739 1/55 Orlando _____ 336—79 X JOHN F. BURNS, *Primary Examiner.*